United States Patent [19]

Staendeke et al.

[11] Patent Number: 5,719,200
[45] Date of Patent: Feb. 17, 1998

[54] FLAME-RESISTANT POLYUREA FOAM

[75] Inventors: Horst Staendeke, Lohmar; Reinhold Lagoda, Kaierberg, both of Germany

[73] Assignee: Hoechst Aktiengesellschaft, Germany

[21] Appl. No.: 586,681

[22] PCT Filed: Mar. 22, 1995

[86] PCT No.: PCT/EP95/01073

§ 371 Date: Jul. 1, 1996

§ 102(e) Date: Jul. 1, 1996

[87] PCT Pub. No.: WO95/26322

PCT Pub. Date: Oct. 5, 1995

[30] Foreign Application Priority Data

Mar. 25, 1994 [DE] Germany ............. 44 10 378.6

[51] Int. Cl.⁶ .................................... C08G 18/10
[52] U.S. Cl. ................. 521/106; 521/120; 521/123; 521/128; 521/129; 521/906
[58] Field of Search .................... 521/106, 120, 521/123, 128, 159, 906

[56] References Cited

U.S. PATENT DOCUMENTS

| 5,084,487 | 1/1992 | Becker et al. | 521/159 |
| 5,177,118 | 1/1993 | Duaber et al. | 521/159 |
| 5,364,852 | 11/1994 | Hinz et al. | 521/159 |

FOREIGN PATENT DOCUMENTS

| 88950 | 9/1983 | European Pat. Off. |
| 93392 | 11/1983 | European Pat. Off. |
| 3909083 | 6/1990 | Germany . |
| 9308142 | 4/1993 | WIPO . |
| 9322253 | 11/1993 | WIPO . |

*Primary Examiner*—Morton Foelak
*Attorney, Agent, or Firm*—Connolly & Hutz

[57] ABSTRACT

The flame-resistant polyurea foam of the invention contains calcium sulfate dihydrate as filler and ammonium polyphosphate as flame retardant. Its bulk density is from 25 to 250 kg/m³ and the number of open cells is above 80% of all its cells. The polyurea has been formed from a reaction of prepolymers of diphenylmethane 4,4'-diisocyanate with water.

The polyurea foam of the invention can be used as a block foam or on-site foam for sound and/or heat insulation.

11 Claims, 7 Drawing Sheets

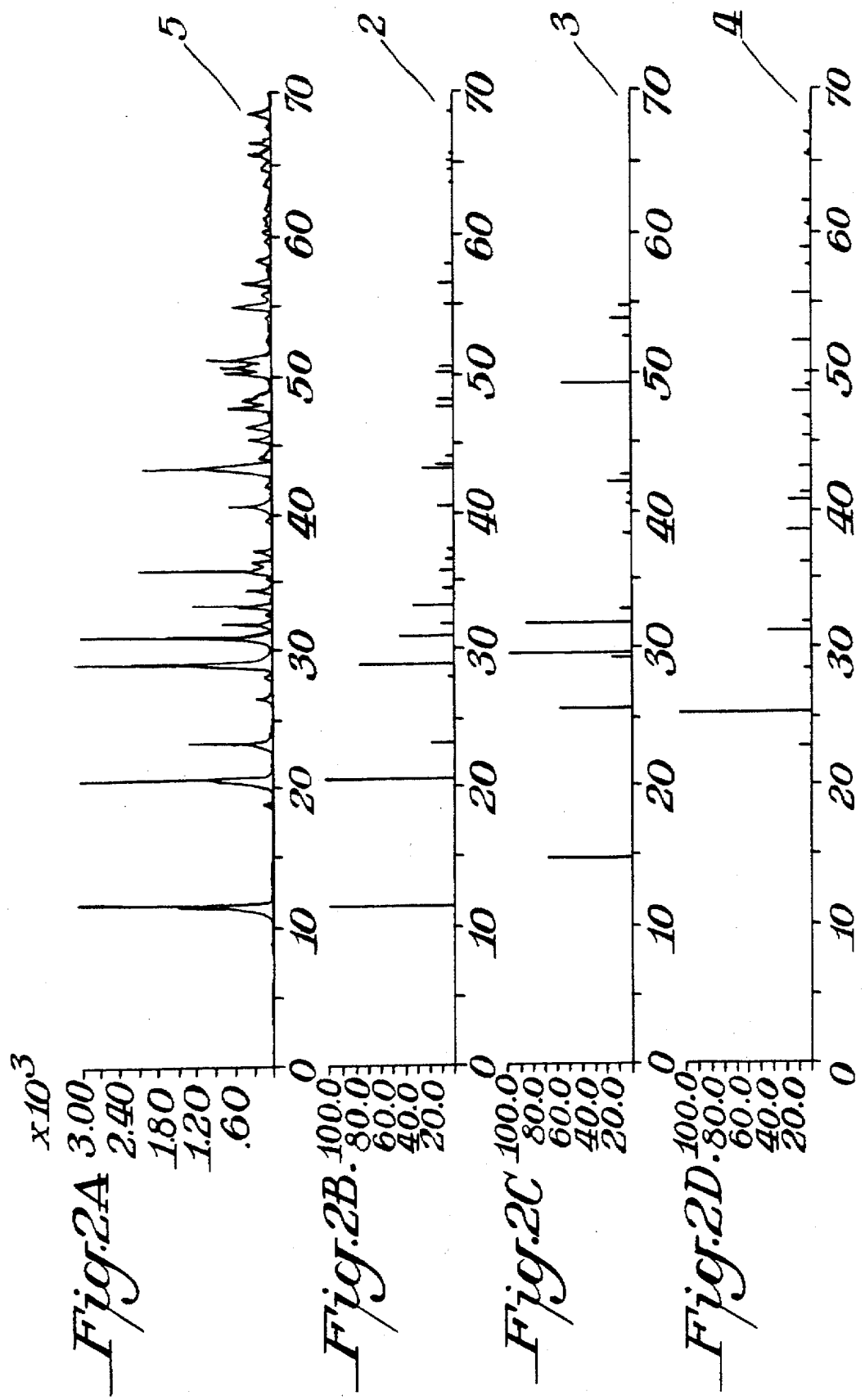

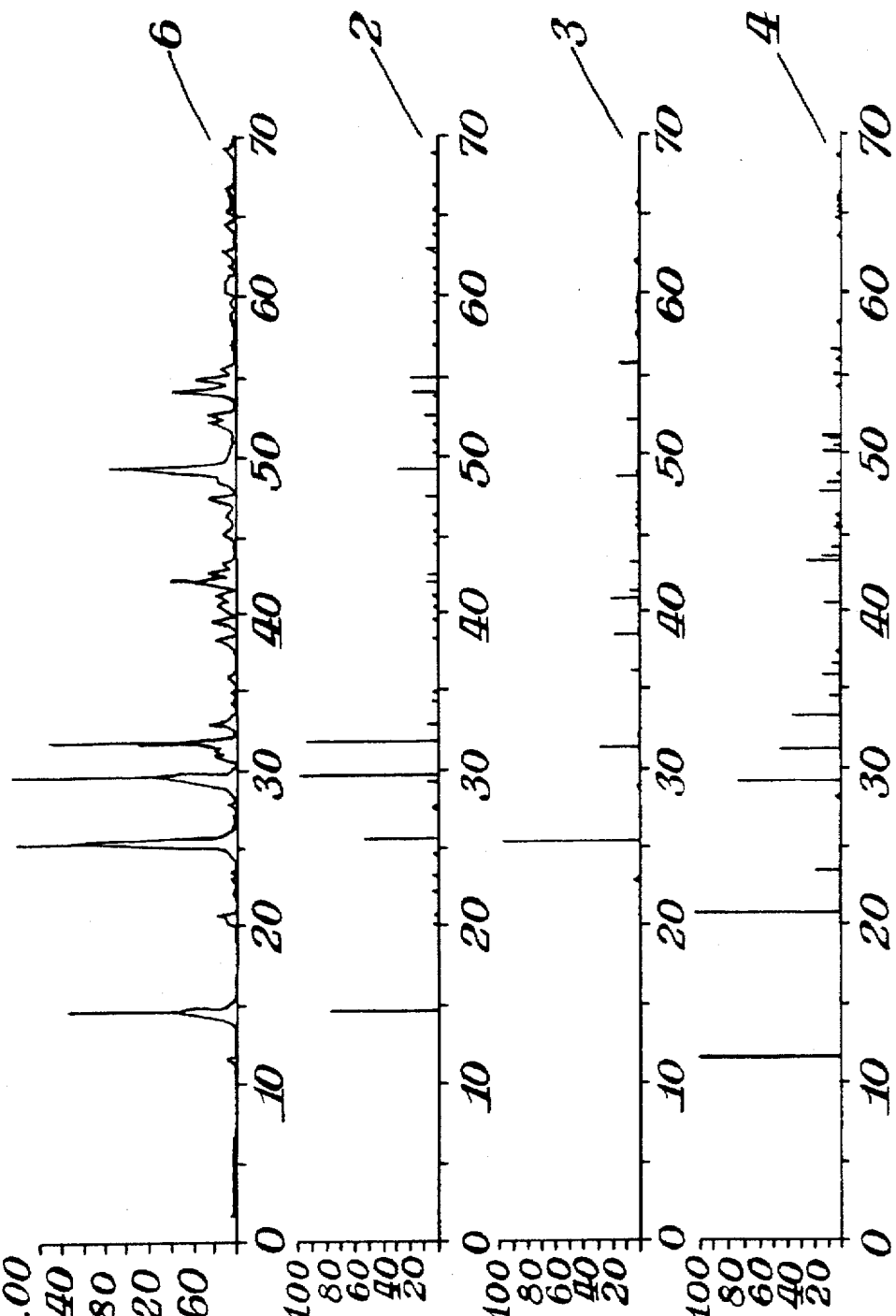

FLAME-RESISTANT POLYUREA FOAM

The invention relates to flame-resistant polyurea foam, a process for its production and its use.

DE 39 09 083 C1 discloses a gypsum foam having a porous structure, containing a polyurea, which has a bulk density of from 100 to 400 kg/m$^3$, is open-celled and contains as polyurea the condensation product of diphenylmethane 4,4'-diisocyanate prepolymers and water. The gypsum foam is to be used as sound and/or heat insulation.

A disadvantage of this process is hydraulically setting calcium sulfate hemihydrate ($\alpha$-calcium sulfate; $CaSO_4 \cdot \frac{1}{2}H_2O$) is to be used as starting material, because the preparation of the latter by dehydration of calcium sulfate dihydrate requires considerable amounts of energy. In the subsequent processing of the prior art (DE 39 09 083 C1, Examples 1 and 2), gypsum materials having a bulk density of above 1000 kg/m$^3$ are obtained, so that the bulk density region of less than 100 kg/m$^3$ (=<0.1 g/cm$^3$) which is of interest for the most important application sector (heat insulation, acoustics) is not achieved. In addition, such materials cannot be used for the application area of sound absorption, since no cell structure is present. Likewise, there are no indications as to whether, and, if so, how the gypsum "foams" described can be made flame-resistant, which is an indispensable prerequisite for their use as building materials for heat insulation and sound absorption. The process indicated would be difficult to transfer to the industrial scale, since the mixtures obtained according to the prior art (DE 39 09 083 C1, Examples 1 and 2) have a mortar-like consistency.

Surprisingly, these problems can be solved by, according to the invention, starting out from calcium sulfate dihydrate, by using relatively large amounts of water and prepolymers of diphenylmethane 4,4'-diisocyanate to ensure that the mixtures of the starting components are pumpable or castable and by using ammonium polyphosphate as flame retardant.

Thus, addition of ammonium polyphosphate made it possible to produce open-celled and light (bulk density: <100 kg/m$^3$) polyurea foams which met the requirements of the German Building Material Class DIN 4102-B2 if the bulk density was above 35 kg/m$^3$ and the proportion of gypsum was over 30% by mass.

Furthermore, it was possible for the first time, by addition of ammonium polyphosphate, to produce open-celled, light (bulk density: <100 kg/m$^3$) and fire-resistant polyurea foams which met the requirements of the German Building Material Class DIN 4102-B1. This was surprising and not foreseeable because with falling bulk density the proportion of noncombustible inorganic filler has to be reduced and the proportion of combustible polyurea has to be increased to the same extent.

A very important side effect of the use of ammonium polyphosphate as flame retardant is the better binding of the gypsum into the polyurea foam. While a gypsum-filled polyurea foam which has been produced without use of ammonium polyphosphate forms a great deal of dust during processing with partial loss of the pulverulent gypsum, in the polyurea foams of the invention the dusting is suppressed even when only small amounts of ammonium polyphosphate are used.

A BRIEF DESCRIPTION OF THE DRAWINGS

FIG. 2 shows the X-ray analysis of another type of gypsum according to this invention.

FIG. 3 shows the X-ray analysis of plaster of paris according to this invention.

Figure 1A:
FIG. 1 shows the X-ray analysis of gypsum according to this invention.
Figure 1B:
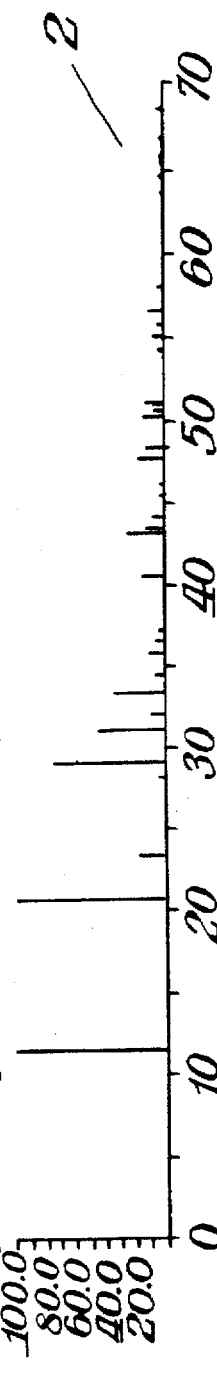
Figure 1C:
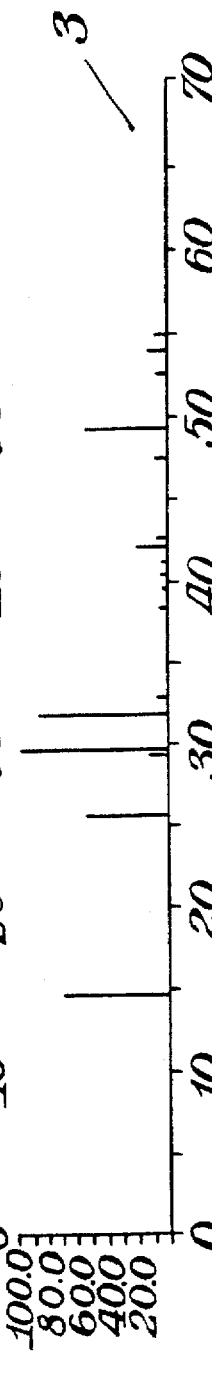
Figure 1D:
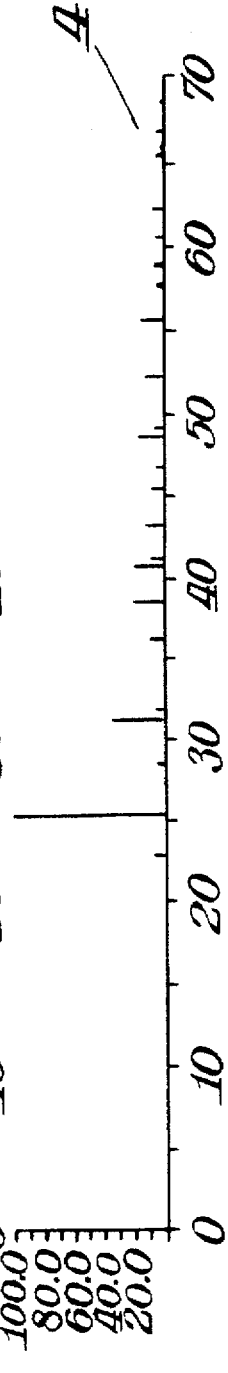

In detail, the invention now provides a flame-resistant polyurea foam which
- contains calcium sulfate dihydrate,
- contains, as flame retardant, ammonium polyphosphate, if desired in combination with further halogen-free flame retardants and/or halogen-free synergists,
- has a bulk density of from 25 to 250 kg/m$^3$,
- has a number of open cells which is above 80% of all its cells,
- comprises polyurea which has been formed from a reaction of prepolymers of diphenylmethane 4,4'-diisocyanate with water.

The polyurea foam of the invention can furthermore, preferably and as desired,
1. contain calcium sulfate dihydrate in the form of natural gypsum or chemical gypsum (e.g. from flue gas desulfurization of power stations);
2. contain, as flame retardant, a free-flowing, pulverulent ammonium polyphosphate of the formula $(NH_4PO_3)_n$ having n=20 to 1000, preferably from 500 to 1000, which is sparingly soluble in water;
3. have the ammonium polyphosphate microencapsulated and contain from 0.5 to 25% by mass of a water-insoluble, if desired cured, synthetic resin which encloses the individual ammonium polyphosphate particles;
4. have a bulk density of from 35 to 90 kg/m$^3$;
5. have the following composition (% by mass):
   a) from 15 to 70%, preferably from 20 to 60%, of polyurea,
   b) from 25 to 80%, preferably from 30 to 70%, of calcium sulfate dihydrate,
   c) from 1 to 15%, preferably from 2 to 10%, of flame retardant, and, if desired, d) from 0.1 to 5%, preferably from 0.2 to 2%, of fibrous fillers,
   e) from 0.1 to 2% of catalysts based on nitrogen compounds for the isocyanate/water reaction,
   f) from 0.1 to 2% of foam stabilizers based on polysiloxanes,
   g) from 0.01 to 2% by weight of auxiliaries for dispersion and/or suspension and/or making thixotropic.

The invention further provides a process for producing the new polyurea foam, which comprises mixing calcium sulfate dihydrate, flame retardant, prepolymers of diphenylmethane 4,4'-diisocyanate, water and, if desired, fibrous fillers, catalysts, foam stabilizers and also dispersants and/or suspending agents and/or thixotropes, with the foaming proceeding as a result of the formation of carbon dioxide, and bringing the cured foam to a residual moisture content of below 2%.

The process step of the invention for removing the moisture of the filler-containing polyurea foam is indispensable, since the polyurea foam obtained after the foaming reaction is complete has the nature of a soft foam which is only lost as a result of the drying step in which a weight loss of 20–30% occurs. With this drying step, the polyurea foam takes on a rigid foam structure having corresponding mechanical strength values.

The fibrous fillers serve to improve the mechanical strength of the polyurea foam; inorganic (e.g. glass fibers) or organic (e.g. cellulose fibers from waste-paper) fiber materials can be used.

A preferred embodiment of the process of the invention can further comprise mixing from 15 to 60% by mass of calcium sulfate dihydrate,
from 15 to 45% by mass of prepolymers of diphenylmethane 4,4'-diisocyanate,
from 25 to 50% by mass of water,
from 0.5 to 10% by mass of flame retardant,
and, if desired,
from 0.1 to 5% by mass of fibrous fillers,
from 0.1 to 2% by mass of catalysts based on nitrogen compounds for the isocyanate/water reaction,
from 0.1 to 2% by mass of foam stabilizers based on polysiloxanes and
from 0.01 to 2% by mass of dispersants and/or suspending agents and/or thixotropes.

Finally, the invention provides for the use of the new polyurea foam as block foam or on-site foam for sound and/or heat insulation.

Said block foam serves, for example, for the production of acoustic boards, heat insulation boards, composite boards or shaped parts, for example insulation shells produced by milling machining for pipes or apparatus, or as granular insulation material for loose beds.

EXAMPLES

In the following examples, the following starting materials were used:

- Calcium sulfate dihydrate (flue gas desulfurization gypsum F)

Use was made of gypsum from the flue gas desulfurization plant of the Frauenaurach power station, which had a mean particle size of 0.030 mm and whose X-ray analysis (see FIG. 1) indicated that it was calcium sulfate dihydrate containing at most 1% of calcium sulfate hemihydrate or calcium sulfate anhydrite. This also confirms the thermogravimetric analysis (see FIG. 4).

- Calcium sulfate dihydrate (flue gas desulfurization gypsum H)

Use was made of gypsum from the flue gas desulfurization plant of the Heilbronn power station, which had a mean particle size of 0.028 mm and whose X-ray analysis (see FIG. 2) indicated that it was calcium sulfate dihydrate containing at most 1% of calcium sulfate hemihydrate or calcium sulfate anhydrite. This also confirms the thermogravimetric analysis (see FIG. 5).

- Calcium sulfate hemihydrate

Stucco plaster from Gebr. Knauf, Neuss works, whose X-ray analysis (see FIG. 3) indicated that it was calcium sulfate hemihydrate having low contents of calcium sulfate dihydrate and calcium sulfate anhydrite. This also confirms the thermogravimetric analysis (see FIG. 6).

- ®Sapogenat T-040 (Hoechst AG, Frankfurt/Main)

This tributylphenol polyglycol ether (containing 4 mol of ethylene oxide) is a liquid having a density of 0.97 g/ml (at 50° C.) and a viscosity of 40–60 mPa.s (at 50° C.).

- ®Hostaflam AP 462 (Hoechst AG, Frankfurt/Main)

A microencapsulated long-chain ammonium polyphosphate [$(NH_4PO_3)_n$, n=about 1000] as a fine white powder having extremely low solubility in water.

- ®Elastan 8009 (Elastogran GmbH, Lemfoerde)

A prepolymer of diphenylmethane 4,4'-diisocyanate having an NCO content of 16.4% and a viscosity at 25° C. of about 5000 mPa.s.

EXAMPLE 1 (COMPARISON)

In a 2 l stirred vessel, 175 g of flue gas desulfurization gypsum F, 35 g of ®Hostaflam AP 462 and 11 g of a 2% strength solution of a commercial suspending agent based on a high molecular weight polysaccharide were stirred into 280 ml of water and, after sufficient homogenization, were mixed with 350 g of ®Elastan 8009. After a stirring time of 1–2 minutes (at 1500–2000 rpm), the mixture was poured into an open wooden mold having the dimensions 20 cm×20 cm×40 cm. After a further reaction time of about 2 hours, the foam block was taken from the wooden mold and stored for 24 hours at room temperature. The bulk density of the moist foam block (after removal of the external skin) was 52 kg/m$^3$; after drying to constant weight at 60° C., the value fell to 40 kg/m$^3$. The test pieces for the small burner test in accordance with DIN 53438, part 2, were sawn therefrom in the rise direction and, prior to the fire test, were stored for 48 hours in the standard environment in accordance with DIN 50014-23/50-2. The fire test was carried out on test specimens having a thickness of 13 mm.

The test results are summarized in Table 1.

The gypsum-filled polyurea foam had the following composition:

| | |
|---|---|
| 31% | by mass of calcium sulfate dihydrate |
| 6% | by mass of ® Hostaflam AP 462 |
| 63% | by mass of polyurea |
| <0.1% | by mass of polysaccharide |

EXAMPLE 2 (ACCORDING TO THE INVENTION)

The procedure of Example 1 was repeated, but using 52.5 g of ®Hostaflam AP 462.

The gypsum-filled polyurea foam had the following composition:

| | |
|---|---|
| 30% | by mass of calcium sulfate dihydrate |
| 9% | by mass of ® Hostaflam AP 462 |
| 61% | by mass of polyurea |
| <0.1% | by mass of polysaccharide |

The test results are summarized in Table 1.

EXAMPLE 3 (ACCORDING TO THE INVENTION)

The procedure of Example 1 was repeated, but using 70 g of ®Hostaflam AP 462.

The gypsum-filled polyurea foam had the following composition:

| | |
|---|---|
| 29% | by mass of calcium sulfate dihydrate |
| 12% | by mass of ® Hostaflam AP 462 |
| 59% | by mass of polyurea |
| <0.1% | by mass of polysaccharide |

The test results are summarized in Table 1.

EXAMPLE 4 (COMPARISON)

The procedure of Example 1 was repeated, but using 350 ml of water, 210 g of flue gas desulfurization gypsum F and 26.25 g of ®Hostaflam AP 462.

The gypsum-filled polyurea foam had the following composition:

| | |
|---|---|
| 36% | by mass of calcium sulfate dihydrate |
| 5% | by mass of ® Hostaflam AP 462 |
| 59% | by mass of polyurea |
| <0.1% | by mass of polysaccharide |

The test results are summarized in Table 1.

EXAMPLE 5 (ACCORDING TO THE INVENTION)

The procedure of Example 1 was repeated, but using 350 ml of water, 210 g of flue gas desulfurization gypsum and 35 g of ®Hostaflam AP 462.

The gypsum-filled polyurea foam had the following composition:

| | |
|---|---|
| 35% | by mass of calcium sulfate dihydrate |
| 6% | by mass of ® Hostaflam AP 462 |
| 59% | by mass of polyurea |
| <0.1% | by mass of polysaccharide |

The test results are summarized in Table 1.

EXAMPLE 6 (COMPARISON)

The procedure of Example 1 was repeated, but using 400 ml of water, 245 g of flue gas desulfurization gypsum F and 26.25 g of ®Hostaflam AP 462.

The gypsum-filled polyurea foam had the following composition:

| | |
|---|---|
| 40% | by mass of calcium sulfate dihydrate |
| 4% | by mass of ® Hostaflam AP 462 |
| 56% | by mass of polyurea |
| <0.1% | by mass of polysaccharide |

The test results are summarized in Table 1.

EXAMPLE 7 (ACCORDING TO THE INVENTION)

The procedure of Example 1 was repeated, but using 400 ml of water, 245 g of flue gas desulfurization gypsum and 35 g of ®Hostaflam AP 462.

The gypsum-filled polyurea foam had the following composition:

| | |
|---|---|
| 39% | by mass of calcium sulfate dihydrate |
| 6% | by mass of ® Hostaflam AP 462 |
| 55% | by mass of polyurea |
| <0.1% | by mass of polysaccharide |

The test results are summarized in Table 1.

EXAMPLE 8 (COMPARISON)

The procedure of Example 1 was repeated, but using 450 ml of water, 280 g of flue gas desulfurization gypsum F and 8.75 g of ®Hostaflam AP 462.

The gypsum-filled polyurea foam had the following composition:

| | |
|---|---|
| 44% | by mass of calcium sulfate dihydrate |
| 1% | by mass of ® Hostaflam AP 462 |
| 55% | by mass of polyurea |
| <0.1% | by mass of polysaccharide |

The test results are summarized in Table 1.

EXAMPLE 9 (ACCORDING TO THE INVENTION)

The procedure of Example 1 was repeated, but using 450 ml of water, 280 g of flue gas desulfurization gypsum F and 17.5 g of ®Hostaflam AP 462.

The gypsum-filled polyurea foam had the following composition:

| | |
|---|---|
| 43% | by mass of calcium sulfate dihydrate |
| 3% | by mass of ® Hostaflam AP 462 |
| 54% | by mass of polyurea |
| <0.1% | by mass of polysaccharide |

The test results are summarized in Table 1.

EXAMPLE 10 (ACCORDING TO THE INVENTION)

The procedure of Example 1 was repeated, but using 450 ml of water, 350 g of flue gas desulfurization gypsum F and 8.75 g of ®Hostaflam AP 462.

The gypsum-filled polyurea foam had the following composition:

| | |
|---|---|
| 50% | by mass of calcium sulfate dihydrate |
| 1% | by mass of ® Hostaflam AP 462 |
| 49% | by mass of polyurea |
| <0.1% | by mass of polysaccharide |

The test results are summarized in Table 1.

EXAMPLE 11 (ACCORDING TO THE INVENTION)

The procedure of Example 1 was repeated, but using 450 ml of water, 350 g of flue gas desulfurization gypsum F and 17.5 g of ®Hostaflam AP 462.

The gypsum-filled polyurea foam had the following composition:

| | |
|---|---|
| 49% | by mass of calcium sulfate dihydrate |
| 2% | by mass of ® Hostaflam AP 462 |
| 49% | by mass of polyurea |
| <0.1% | by mass of polysaccharide |

The test results are summarized in Table 1.

EXAMPLE 12 (ACCORDING TO THE INVENTION)

The procedure of Example 1 was repeated, but using 450 ml of water, 350 g of flue gas desulfurization gypsum F and 17.5 g of ®Hostaflam AP 462 and 2 g of cellulose fibers.

The gypsum-filled polyurea foam had the following composition:

| | |
|---|---|
| 49% | by mass of calcium sulfate dihydrate |
| 2% | by mass of ® Hostaflam AP 462 |
| 48% | by mass of polyurea |
| 0.3% | by mass of cellulose fibers |
| <0.1% | by mass of polysaccharide |

The test results are summarized in Table 1.

EXAMPLE 13 (ACCORDING TO THE INVENTION)

The procedure of Example 1 was repeated, but using 450 ml of water, 385 g of flue gas desulfurization gypsum F and 8.75 g of ®Hostaflam AP 462.

The gypsum-filled polyurea foam had the following composition:

| | |
|---|---|
| 52% | by mass of calcium sulfate dihydrate |
| 1% | by mass of ® Hostaflam AP 462 |
| 47% | by mass of polyurea |
| <0.1% | by mass of polysaccharide |

The test results are summarized in Table 1.

EXAMPLE 14 (ACCORDING TO THE INVENTION)

The procedure of Example 1 was repeated, but using 450 ml of water, 420 g of flue gas desulfurization gypsum F and 8.75 g of ®Hostaflam AP 462.

The gypsum-filled polyurea foam had the following composition:

| | |
|---|---|
| 54% | by mass of calcium sulfate dihydrate |
| 1% | by mass of ® Hostaflam AP 462 |
| 45% | by mass of polyurea |
| <0.1% | by mass of polysaccharide |

The test results are summarized in Table 1.

EXAMPLE 15 (ACCORDING TO THE INVENTION)

Figure 7:
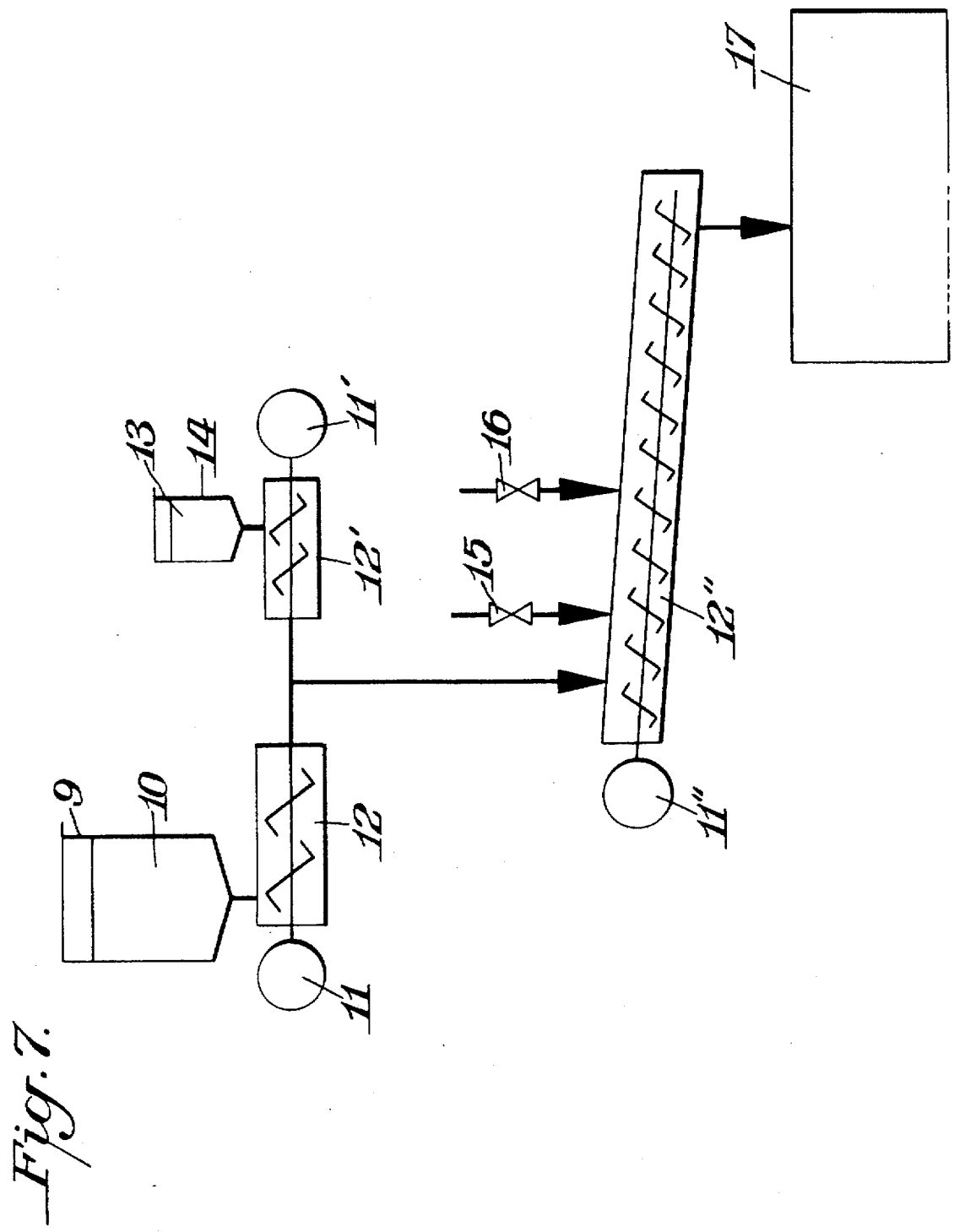
FIG. 7 illustrates an apparatus used in the preparation of polyurea foam according to this invention.

In a plant schematically shown in FIG. 7,

| | |
|---|---|
| 90 kg | of flue gas desulfurization gypsum F |
| 11 kg | of ® Hostaflam AP 462 |
| 35 kg | of ® Elastan 8009 |
| 60 kg | of water | were mixed at room temperature and introduced into a closed, nongastight steel mold having the dimensions 1.6 m×1.0 m×1.0 m, with a foam formation process commencing after a few minutes as a result of the formation of carbon dioxide. After the foaming process was complete, the solid block obtained was sawn into slices having a thickness of about 50 mm, these being dried at about 60° C. in a stream of warm air.

The following values were determined on the foam plates which had a bulk density of 79.9 kg/m$^3$:

| | | |
|---|---|---|
| Oxygen index | (ASTM-D2863) | 0.41 |
| Thermal conductivity | (DIN 52612) | 0.048 W/m · K |
| Open cell content | (ASTM-D2856/87) | 98.3% |

The gypsum-filled polyurea foam had the following composition:

| | |
|---|---|
| 66% | by mass of calcium sulfate dihydrate |
| 8% | by mass of ® Hostaflam AP 462 |
| 26% | by mass of polyurea. |

The test results obtained in the fire resistance test in accordance with DIN 4102 are summarized in Table 2.

EXAMPLE 16 (ACCORDING TO THE INVENTION)

The procedure of Example 14 was repeated, but using the following starting materials:

| | |
|---|---|
| 90 kg | of flue gas desulfurization gypsum F |
| 11 kg | of ® Hostaflam AP 462 |
| 35 kg | of ® Elastan 8009 |
| 65 kg | of water in which 45 g of a commercial suspending agent based on a high molecular weight polysaccharide had been dissolved. |

Test specimens for the fire resistance test in accordance with DIN 4102 were sawn from the dried, 49 mm thick foam plates which had a bulk density of 89.6 kg/m$^3$, and these were stored to constant weight in the standard environment (DIN 50014-23/50-2).

The test results are summarized in Table 2.

The gypsum-filled polyurea foam had the following composition:

| | |
|---|---|
| 66% | by mass of calcium sulfate dihydrate |
| 8% | by mass of ® Hostaflam AP 462 |
| 26% | by mass of polyurea |
| <0.1% | by mass of polysaccharide |

EXAMPLE 17 (ACCORDING TO THE INVENTION)

The procedure of Example 14 was repeated, but using the following starting materials:

| | |
|---|---|
| 90 kg | of flue gas desulfurization gypsum H |
| 11 kg | of ® Hostaflam AP 462 |
| 36 kg | of ® Elastan 8009 |
| 65 kg | of water |

Test specimens for the fire resistance test in accordance with DIN 4102 were sawn from the dried, 48 mm thick foam plates which had a bulk density of 85.6 kg/m$^3$, and these were stored to constant weight in the standard environment (DIN 50014-23/50-2).

The test results are summarized in Table 2.

The gypsum-filled polyurea foam had the following composition:

| | |
|---|---|
| 66% | by mass of calcium sulfate dihydrate |
| 8% | by mass of ® Hostaflam AP 462 |
| 26% | by mass of polyurea. |

EXAMPLE 18 (COMPARISON)

In DE 39 09 083 C1, "gypsum foam having a porous structure, process for its production and its use", it is stated in column 3, lines 47–50 that "as gypsum in the present invention, all neutral or weakly acid, hydraulically setting calcium sulfate modifications ... can be used". In repeating the Examples 1 and 2, the following was found:

* When 360 g of stucco plaster, 89.3 g of water, 89.3 g of ®Elastan 8009 and 2.4 g of ®Sapogenat T-040 were mixed as described in Example 1, no foaming process was observed and a gray-white, stone-like product was obtained, this having no porous structure.

After a storage time of 24 hours at room temperature, the product had a bulk density of 1190 kg/m$^3$. After drying to constant weight at 60° C., a bulk density of 1125 kg/m$^3$ was found.

[Note: The drying is a process step which is not provided for in DE 39 09 083.]

* When 360 g of stucco plaster, 119.2 g of water, 72.4 g of ®Elastan 8009 and 2.4 g of ®Sapogenat T-040 were mixed as described in Example 2, no foaming process was observed and a gray-white, stone-like product was likewise obtained, this having no porous structure. After a storage time of 24 hours at room temperature, a bulk density of 1030 kg/m$^3$ was measured, which fell to 930 kg/m$^3$ after drying to constant weight at 60° C.

To ensure that the non-usability of calcium sulfate hemihydrate is not restricted to the mixing ratios of the Examples 1 and 2, further experiments were carried out using a higher amount of water and also using an increased amount of water and an increased amount of isocyanate prepolymer.

* using a method similar to Example 2, doubled amount of water

When 360 g of stucco plaster, 238.4 g of water, 72.4 g of ®Elastan 8009 and 2.4 g of ®Sapogenat T-040 were mixed, no foaming process was observed and a gray-white, stone-like product was obtained, this having no porous structure.

After a storage time of 24 hours at room temperature, a bulk density of 1280 kg/m$^3$ was determined, which fell to 970 kg/m$^3$ after drying to constant weight at 60° C.

* using a method similar to Example 2, a quadrupled amount of water

When 360 g of stucco plaster, 476.8 g of water, 72.4 g of ®Elastan 8009 and 2.4 g of ®Sapogenat T-040 were mixed, no foaming process was observed and a gray-white, stone-like product was obtained, this having virtually no porous structure.

After a storage time of 24 hours at room temperature, the bulk density was 1120 kg/m$^3$ which fell to 620 kg/m$^3$ after drying to constant weight at 60° C.

* using a method similar to Example 2, doubled amount of water, doubled amount of isocyanate prepolymer When 360 g of stucco plaster, 238.4 g of water, 144.8 g of ®Elastan 8009 and 2.4 g of ®Sapogenat T-040 were mixed, no foaming process was observed and a gray-white, stone-like product was obtained, this having only a weakly pronounced, porous structure. After a storage time of 24 hours at room temperature, the bulk density was 660 kg/m$^3$ which fell to 470 kg/m$^3$ after drying to constant weight at 60° C.

As can be seen from the above comparative examples, in no case were gypsum foams having a bulk density of from 100 to 400 kg/m$^3$ able to be produced. Therefore, the statements of DE-C 39 09 083 that hydraulically setting calcium sulfate modifications can be used and that bulk density ranges from 100 to 400 kg/m$^3$ (corresponds to from 0.1 to 0.4 g/cm$^3$) can be achieved and also that the gypsum foam of the invention is open-celled, are not accurate.

An X-ray analysis of different gypsum varieties is shown in FIGS. 1 to 3. All patterns were recorded using an automatic powder diffractometer (Model APD 1700) from Philips, Kassel (DE). In all three Figures, the relative intensity of the reflections appears along the x axis and the diffraction angle (CuK$_α$ radiation) along the y axis.

In FIG. 1 the reference symbol (1) represents the X-ray diffraction pattern of REA gypsum F (gypsum from the stack gas or flue gas desulphurization plant of the Frauenaurach power station (DE)), while the X-ray diffraction pattern of calcium sulphate dihydrate ($CaSO_4.2H_2O$) is denoted by (2), that of calcium sulphate hemihydrate ($CaSO_4.½H_2O$) by (3) and that of calcium sulphate anhydride ($CaSO_4$) by (4).

Accordingly, the X-ray diffraction pattern (5) of REA gypsum H (gypsum from the stack gas desulphurization plant of the Heilbronn power station (DE)) is shown in FIG. 2, the reference symbols (2), (3) and (4) relating to the various $CaSO_4$ types, as in FIG. 1.

FIG. 3 shows the X-ray diffraction pattern (6) of plaster of paris (stucco plaster) from Gebr. Knauf, Neuss works (DE), in comparison with the abovementioned $CaSO_4$ types.

Figure 4:
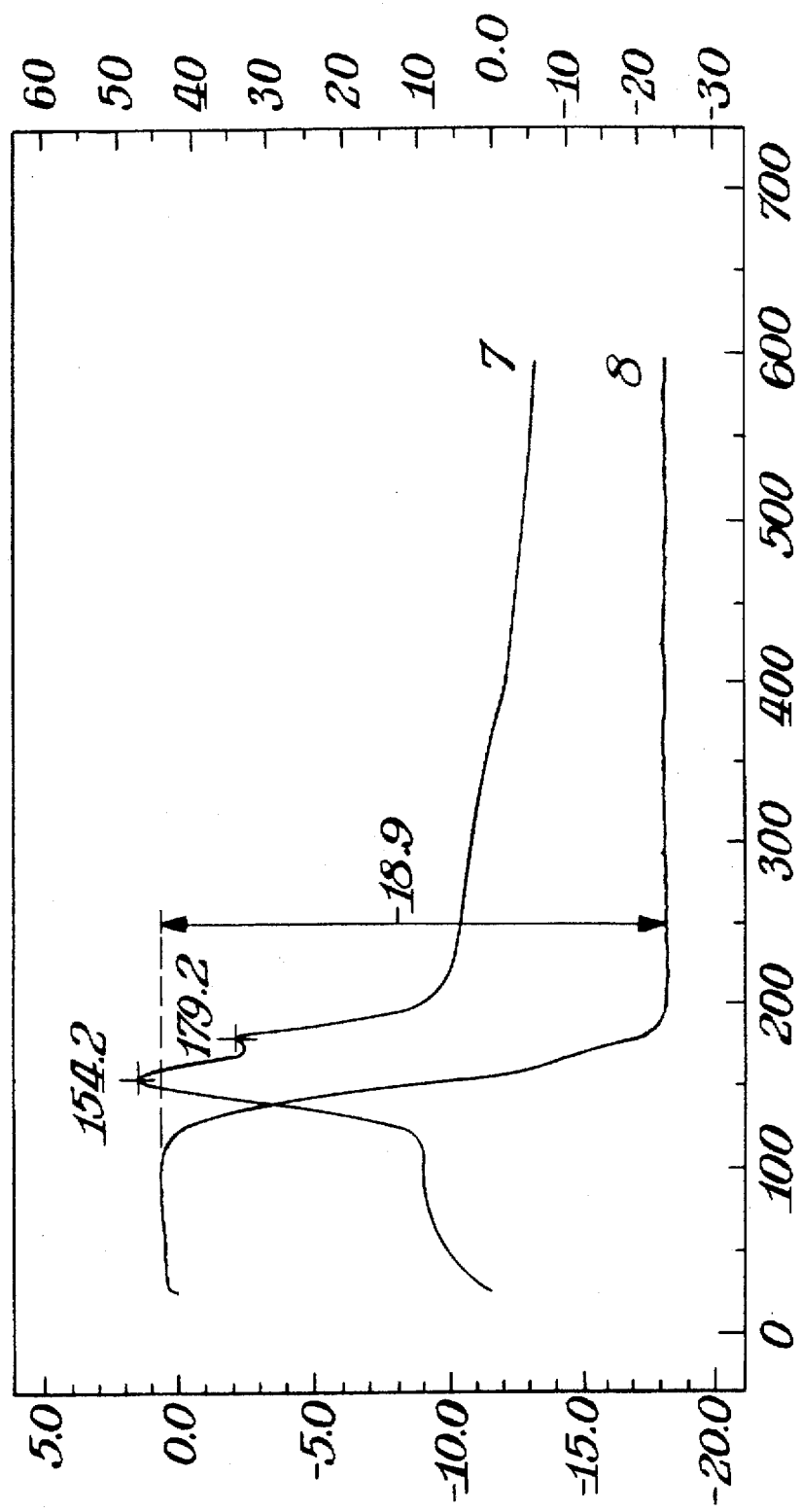
FIG. 4 shows thermogravimetric analysis of gypsum according to this invention.
Figure 5:
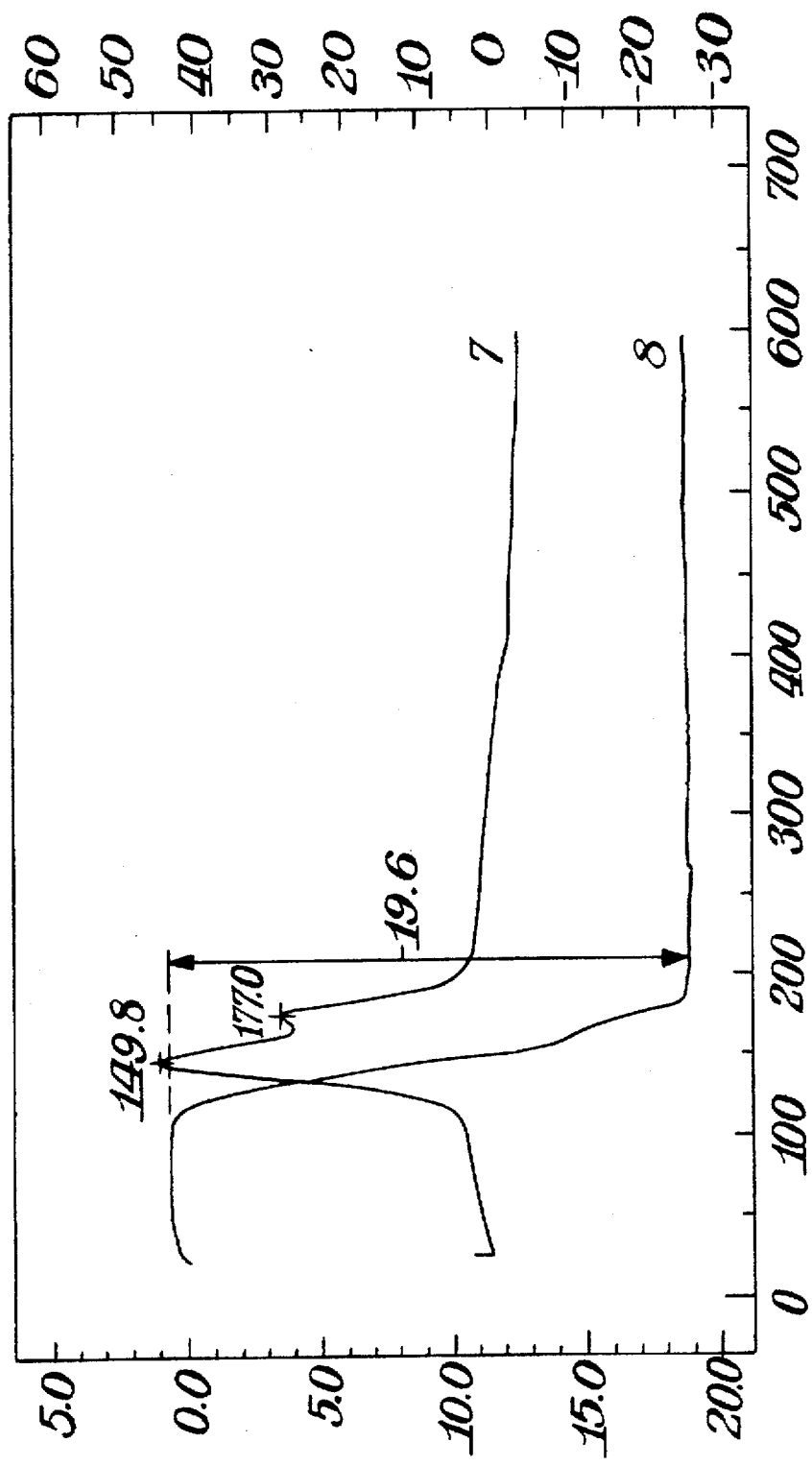
FIG. 5 shows thermogravimetric analysis of another type gypsum according to this invention.
Figure 6:
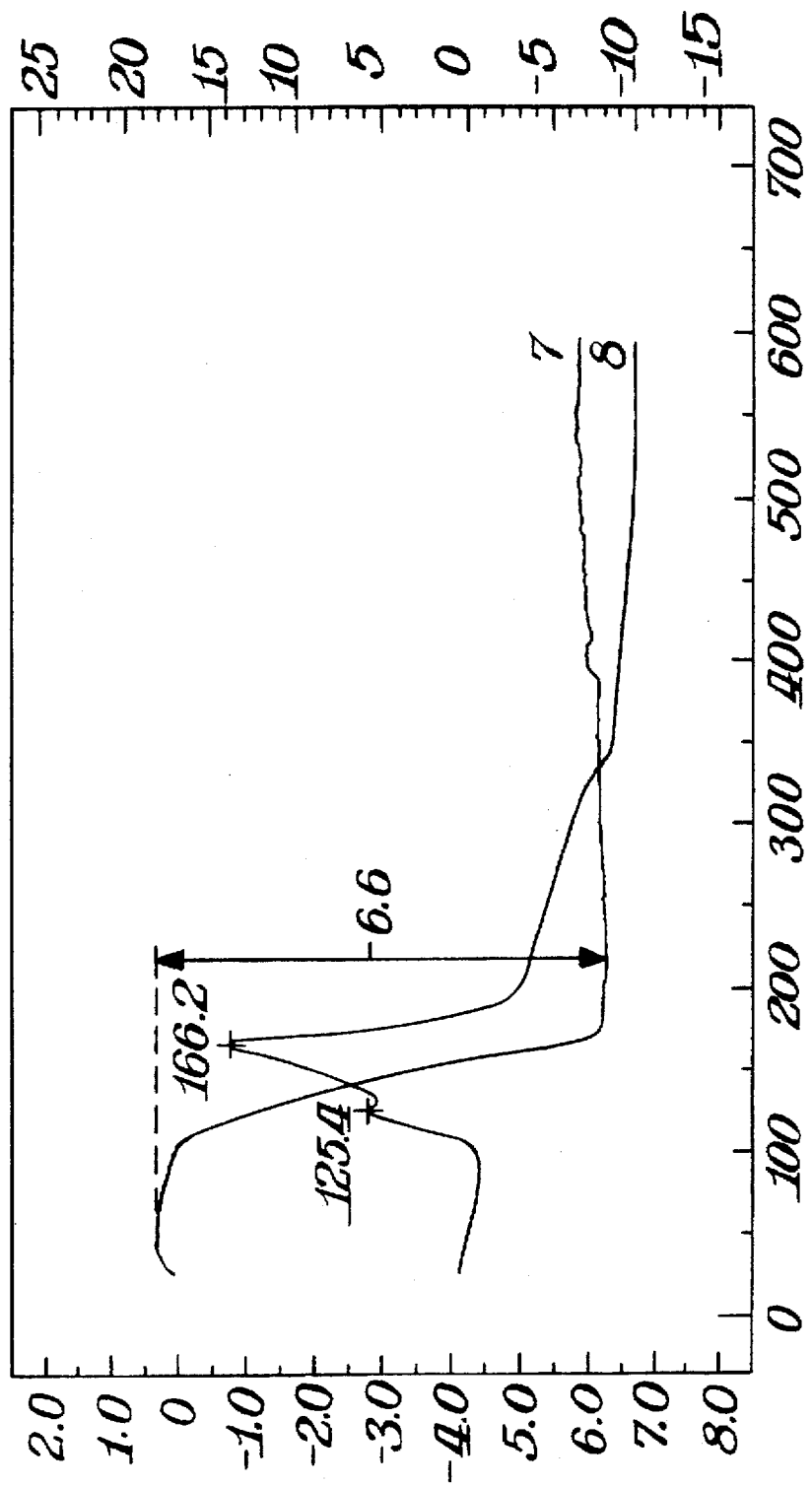
FIG. 6 shows thermogravimetric analysis of plaster of paris according to this invention.

The results of the thermogravimetric analysis of different gypsum varieties are shown in FIGS. 4 to 6. All analyses were carried out using a simultaneous thermo-analysis apparatus (Model 409 C) from Netsch, Selb (DE). In FIGS. 4 to 6, the percentage by mass (left) and the degree of heat in (µv) (right) are shown along the x axis, while the y axis shows the temperature in °C. The curve (7) represents in each case the differential thermal analysis (DSC) and the curve (8) the thermogravimetry (TG).

FIG. 4 shows the thermogravimetric analysis of REA gypsum (flue gas desulfurization gypsum) from the Frauenaurach power station. FIG. 5 shows the thermogravimetric analysis of REA gypsum (flue gas desulfurization gypsum) from the Heilbronn power station (in each case from the abovementioned stack gas desulphurization plant) and FIG. 6 shows the thermogravimetric analysis of plaster of paris (stucco plaster) from Gebr. Knauf, Neuss Works (DE).

Finally, FIG. 7 shows an apparatus for the preparation of halogen-free and filler-containing, flame-retardant polyurea foam, in which gypsum (10) is fed from a container (9) via a motor-driven screw (11, 12) and the flameproofing agent (13) from a container (14), likewise via a motor-driven screw (11', 12'), onto a further motor-driven screw (11", 12"), and water and isocyanate prepolymer are added via metering units (15) and (16), respectively. The total mixture is then foamed in the mould (17).

TABLE 1

Fire tests in accordance with DIN 53438, Part 2, on gypsum-filled polyurea foams

| Example | ... Parts of flue gas desulfurization gypsum/100 parts of prepolymer | ... Parts of ®Hostaflam AP 462/100 parts of prepolymer | Bulk density (kg/m³) | DIN 53438 - Flame application at edge | |
|---|---|---|---|---|---|
| | | | | mean flame height (mm) | DIN 4102 class* |
| 1 (Comparison) | 50 | 10 | 40 | >150 | B3 |
| 2 (According to the invention) | 50 | 15 | 38 | 135 | B2 |
| 3 (According to the invention) | 50 | 20 | 40 | 130 | B2 |
| 4 (Comparison) | 60 | 7.5 | 36 | >150 | B3 |
| 5 (According to the invention) | 60 | 10 | 42 | 120 | B2 |
| 6 (Comparison) | 70 | 7.5 | 37 | >150 | B3 |
| 7 (According to the invention) | 70 | 10 | 45 | 120 | B2 |
| 8 (Comparison) | 80 | 2.5 | 41 | >150 | B3 |
| 9 (According to the invention) | 80 | 5 | 41 | 110 | B2 |
| 10 (According to the invention) | 100 | 2.5 | 47 | 140 | B2 |
| 11 (According to the invention) | 100 | 5 | 43 | 110 | B2 |
| 12 (According to the invention) | 100 | 5 | 43 | 100 | B2 |
| 13 (According to the invention) | 110 | 2.5 | 47 | 140 | B2 |
| 14 (According to the invention) | 120 | 2.5 | 49 | 140 | B2 |

*) DIN 4102-B1: "fire resistant"
DIN 4102-B2: "normally flammable"
DIN 4102-B3: "readily flammable"

TABLE 2

Fire tests in accordance with DIN 4102, Part 1, on gypsum-filled polyurea foams

| Example | ... Parts of Flue gas desulfurization gypsum/100 parts of prepolymer | Parts of ®Hostaflam AP 462/100 parts of prepolymer | DIN 4102 Fire Shaft Test | | DIN 4102 Class* |
|---|---|---|---|---|---|
| | | | Residual length[1] (cm) | Flue gas temperature[2] (°C) | |
| 15 (According to the invention) | 257 | 31 | 17 | 134 | B1 |
| 16 (According to the invention) | 257 | 31 | 23 | 124 | B1 |
| 17 (According to the invention) | 250 | 30 | 23 | 125 | B1 |

*) DIN 4102-B1: "fire resistant"
DIN 4102-B2: "normally flammable"
DIN 4102-B3: "readily flammable"
1) Standard requirement: ≧15 cm
2) Standard requirement: ≦200° C.

We claim:

1. A flame-resistant polyurea foam which
   - contains calcium sulfate dihydrate,
   - contains, as flame retardant, ammonium polyphosphate,
   - has a bulk density of from 25 to 250 kg/m³,
   - has a number of open cells which is above 80% of all its cells,
   - comprises polyurea which has been formed from a reaction of prepolymers of diphenylmethane 4,4'-diisocyanate with water.

2. A polyurea foam as claimed in claim 1, wherein said flame retardant is combined with a further halogen-free flame retardant, a halogen-free synergist, or a combination thereof.

3. A polyurea foam as claimed in claim 1, wherein said calcium sulfate dihydrate is natural gypsum or chemical gypsum.

4. A polyurea foam as claimed in claim 1, which contains, as flame retardant, a free-flowing, pulverulent ammonium polyphosphate of the formula $(NH_4PO_3)_n$ having n=20 to 1000 which is sparingly soluble in water.

5. A polyurea foam as claimed in claim 4, wherein, in said formula $(NH_4PO_3)_n$, n is from 500 to 1000.

6. A polyurea foam as claimed in claim 4, wherein the ammonium polyphosphate is microencapsulated and contains from 5 to 25% by mass of a water-insoluble, synthetic resin which encloses the individual ammonium polyphosphate particles and which, optionally, has been cured.

7. A polyurea foam as claimed in claim 1, which has a bulk density of from 35 to 90 kg/m$^3$.

8. A polyurea foam as claimed in claim 1, containing the following components in % by mass:

a) from 15 to 70% of polyurea, b) from 25 to 80% of calcium sulfate dihydrate, c) from 1 to 15% of flame retardant, and, optionally, the following components in % by mass:

d) from 0.1 to 5% of a fibrous filler, e) from 0.1 to 2% of catalysts based on nitrogen compounds for the isocyanate/water reaction, f) from 0.1 to 2% of foam stabilizers based on polysiloxanes, g) from 0.01 to 2% by weight of auxiliaries for dispersion and/or suspension and/or providing thixotropy.

9. A polyurea foam as claimed in claim 8, wherein the amounts of said components a) through c) are as follows: a) from 20 to 60%, b) from 30 to 70%, and c) from 2 to 10%, and, when said component d) is present, the amount of component d) is from 0.2 to 2%.

10. An insulating material comprising a polyurea foam as claimed in claim 1.

11. An insulating material as claimed in claim 10, wherein said material is in the form of a block foam or an on-site foam.

* * * * *